E. ZAHM.
FILTRATION.
APPLICATION FILED JAN. 20, 1912.
1,077,448.
Patented Nov. 4, 1913.
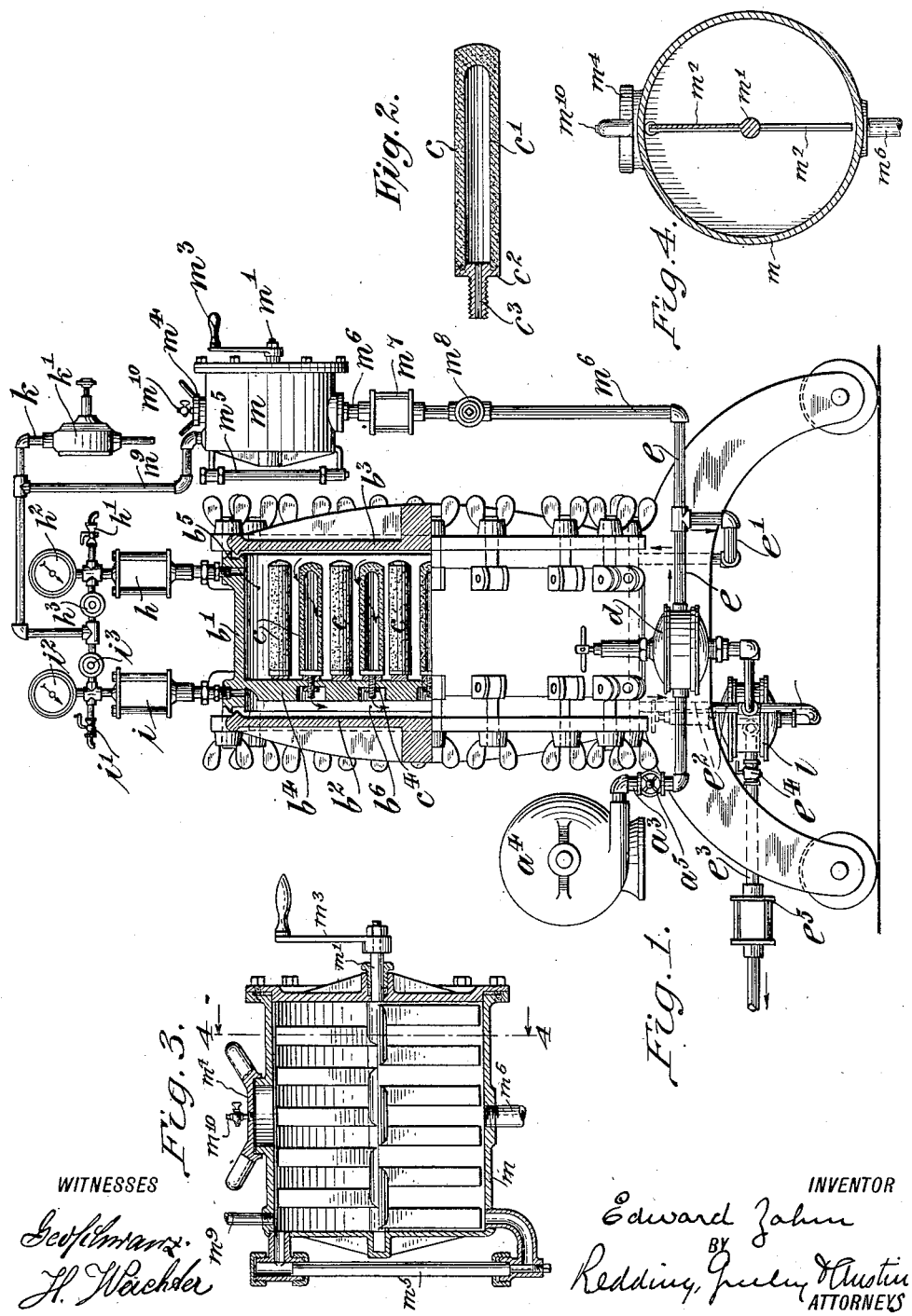
WITNESSES
INVENTOR
Edward Zahm
BY
Redding, Greeley & Austin
ATTORNEYS
COLUMBIA PLANOGRAPH CO., WASHINGTON, D. C.

UNITED STATES PATENT OFFICE.

EDWARD ZAHM, OF BUFFALO, NEW YORK, ASSIGNOR TO ZAHM MANUFACTURING COMPANY, OF BUFFALO, NEW YORK, A CORPORATION OF NEW YORK.

FILTRATION.

1,077,448.  Specification of Letters Patent.  Patented Nov. 4, 1913.

Application filed January 20, 1912. Serial No. 672,463.

*To all whom it may concern:*

Be it known that I, EDWARD ZAHM, a citizen of the United States, residing in Buffalo, Erie county, State of New York, have invented certain new and useful Improvements in Filtration, of which the following is a specification, reference being had to the accompanying drawings, which form a part hereof.

This invention relates to the filtration to sterility of beer and other similar liquids in filters in which the beer or other liquid is forced under a considerable pressure differential through a filter body or filter bodies of such a nature as to prevent the passage of suspended matter which is permitted to pass through filter bodies ordinarily employed in the treatment of beer. In another application, Serial No. 616,231, filed March 22, 1911, there is shown and described a filter of the class referred to, such filter comprising a number of filter bodies or cores of infusorial earth, the invention covered in that application being concerned particularly with the regulation of the pressure. It is found that in the continued operation of such filters the pressure differential increases so as to render frequent cleaning of the filter necessary. Notwithstanding the cleaning of the filter by washing and brushing it is found that the filter bodies gradually become clogged so that the pressure differential under which the beer is forced through the filter is gradually increased. This is believed to be due to the penetration of the filter bodies by matter which remains in suspension at the relatively low temperature of the beer at the time of filtration, such suspended matter consisting of nitrogenous bodies which remain in suspension at the comparatively low temperature but are soluble at higher temperatures. The penetration of the filter bodies by the suspended nitrogenous bodies is retarded by the uniform deposition of loose filter material upon the surface of the filter bodies, such loose filter material retaining many of the suspended bodies of all kinds and being washed off from time to time with the retained suspended bodies, while the removal from the filter bodies of the nitrogenous suspended bodies which may have penetrated the filter bodies is accomplished by raising the temperature in the presence of a cleansing liquid, such as sterilized water, so that such nitrogenous suspended bodies are dissolved and washed out in a state of solution.

The invention will be more fully explained hereinafter with reference to the accompanying drawings in which it is illustrated and in which—

Figure 1 is a view, partly in side elevation and partly in section, of a filter of convenient construction in which the invention is embodied. Fig. 2 is a detail view in section, on a larger scale, of one of the filter cores. Figs. 3 and 4 are detail views, in longitudinal section and transverse section respectively, of the mixer for loose filter material shown in Fig. 1.

The filter shown in the drawings comprises a shell $b^1$, fitted with removable heads or end plates $b^2$ and $b^3$ and provided with a fixed transverse wall $b^4$ which forms within the shell a receiving chamber $b^5$ and a discharge chamber $b^6$. The transverse wall $b^4$ is formed of impermeable material and supports the filter cores $c$, one of which is shown in detail in Fig. 2. As there shown it comprises a filter tube $c^1$ formed of infusorial earth and closed at one end, while the other end is tightly secured to a head $c^2$ provided with a hollow stem $c^3$ which is passed through the wall or plate $b^4$, receiving on the discharge side of the plate a nut $c^4$ by which the core is held tightly in place, suitable packing, not necessary to be shown, being provided to make a tight joint. The beer is delivered to the filter through a pipe $a^3$ from a pump $a^4$ or any other suitable source of supply under pressure and first passes through a regulator, described and shown in said application, and thence, by a pipe $e$, $e^1$, to the receiving chamber $b^5$ of the filter. Under suitable pressure the beer is forced through the walls of the filter cores into the interior thereof, carrying with it some of the suspended bodies, and thence through the hollow stems $c^3$ into the discharge chamber $b^6$. From the latter it passes through a pipe $e^2$, thence through a regulator $l$, also described and shown in detail in said application, and thence through a pipe $e^3$, preferably provided with a stop cock $e^4$ and a sight glass $e^5$, to the bottling machine or elsewhere as may be desired.

In order to prevent the disruption of the gas which is in solution in the beer before it passes through the filter, the necessary predetermined pressure is maintained on the discharge side of the filter, as fully described in said application, by the regulator $l$, while the inflow of beer to the filter is regulated by the regulator $d$, the action of which is controlled by the pressure on the discharge.

It is not necessary to explain herein the construction and operation of the regulators $d$ and $l$, since they form no part of the present invention, but in view of the relation of the parts now to be mentioned to the present invention it will be explained herein, as in said application, that a sight glass $h$, provided with a vent cock $h^1$ and pressure gage $h^2$ and a shut-off cock $h^3$ is connected to the highest point of the supply or receiving chamber $b^5$ of the filter, as shown clearly in Fig. 1, and that a sight glass $i$, provided with a vent cock $i^1$, a pressure gage $i^2$ and a shut-off cock $i^3$ is connected to the highest point of the discharge chamber $b^6$ as also shown in said figure, while a source of gas under pressure, as indicated by a pipe $k$ and the pressure reducing valve $k^1$ may be connected to either or both of the chambers $b^5$ and $b^6$ through the shut-off cocks $h^3$ and $i^3$. A cock $a^5$ is preferably provided in the pipe $a^3$.

In order that the penetration of suspended bodies into the filter bodies, during the continued use of the filter, may be retarded, provision is made for the uniform deposition on the surface of the filter cores $c$ of a quantity of loose filter material, so that such loose filter material may collect and retain the greater part of the suspended bodies which are to be filtered out of the beer and may be removed from time to time by simply washing out the filter, thereby permitting the cores to be used for a much longer time than would otherwise be possible without becoming clogged to such an extent as to require removal and cleansing. The devices provided for the introduction of such loose filter material comprise a mixing vessel $m$, in which the loose filter material may be mixed with a portion of the beer under suitable conditions, particularly without loss of gas in the beer with which the filter material is mixed and in such a manner as to insure uniform deposit of the loose filter material on the surface of the filter bodies, and connections by which the mixture of beer and loose filter material may be discharged under perfect control into the flow of beer toward the filter, so that the loose filter material shall be distributed uniformly over the surface of the filter cores. Any suitable form of mixer may be employed for the purpose. That shown consists of a cylindrical vessel in which is mounted a shaft $m^1$ provided with arms or paddles $m^2$ and with a handle $m^3$ by which the loose filter material, which is introduced through a capped opening $m^4$, may be mixed with beer which is admitted to the vessel $m$ and thereafter forced into the filter. The vessel $m$ is preferably provided with a sight glass $m^5$ and is connected at its bottom by a pipe $m^6$ with the pipe $e$, $e^1$, through which the beer flows into the filter, the pipe $m^6$ preferably having a sight glass $m^7$ and a stop cock $m^8$. At its top the vessel $m$ is connected by a pipe $m^9$ with the source of supply of gas under pressure, being conveniently connected for this purpose to the pipe $k$. After the filter chamber $b^5$ has been filled with beer, the stop cock $m^8$ is opened to permit the vessel $m$ also to be filled with beer, the pet cock $m^{10}$ being opened to permit the escape of the displaced gas under pressure. The loose filter material, which may be loose infusorial earth, having been previously introduced into the vessel $m$, is agitated with the beer until a uniform mixture is obtained. Gas under pressure above that on the beer in the chamber $b^5$ is then admitted to the vessel $m$ by manipulation by the regulator $k^1$ and the cock $m^8$ is opened so that the mixture of beer and filter material is discharged slowly from the vessel $m$ into the filter chamber $b^5$ through the pipes $m^6$ and $e^1$.

It is important to note that in order to secure a uniform distribution of the loose filter material on the surface of all of the filter bodies, only a small portion of the beer flows from the mixer and then only under perfect control, such portion of the beer with the loose filter material being thereafter added to the beer without the loose filter material which flows directly into the filter through the pipe $e$. The operation of filtering is therefore being carried on prior to and at the same time with the addition of the loose filtering material so that as the beer without the loose filter material is flowing constantly into the inlet chamber $b^5$, the loose filter material mixed with a small portion of the beer is also carried slowly into the inlet chamber $b^5$, under perfect regulation, and is deposited uniformly on the surface of the filter cores.

When the operation of filtering has been carried on for a period of time, as for a day, the operation of filtering is discontinued, the head $b^3$ is removed and the loose filter material, with the retained suspended bodies, is washed from the filter cores with a hose. The filter cores or bodies may be brushed while they are in place or, if necessary, they may be removed and brushed. It is to be noted, however, that notwithstanding the protection of the filter bodies or cores by the loose filter material some of the suspended bodies penetrate the filter bodies and gradually clog them. Therefore it is desirable to remove from the filter bodies such suspended bodies as may have penetrated them and this is accomplished, after the operation of filtering has been discontinued and the loose filter material has been washed off, by forcing through the filter a suitable liquid, preferably sterilized water, which is gradually raised to a temperature sufficient to cause the nitrogenous suspended bodies which have penetrated the filter bodies to be dissolved and carried through the filter bodies with the water. The water may be raised to a temperature higher than that which is necessary to dissolve the nitrogenous suspended bodies for the purpose of effectually killing the yeast cells and other micro-organisms and thus insure complete sterility of the apparatus.

In order to avoid an undesirable increase of the resistance of the filter as well as an increase of the operating expense the quantity of loose filter material deposited on the filter bodies should be as small as is consistent with effectiveness and it is therefore specially desirable to secure uniform distribution of such loose filter material. This is accomplished by the apparatus described.

I claim as my invention:—

1. The combination with a filter, of a supply pipe, a container for loose filter material independent of the supply pipe, connections through which a portion of the liquid to be filtered may be admitted to the container and through which the mixture of liquid and loose filter material may be discharged into the filter, and means independent of the liquid supply to force the mixture of liquid and loose filter material from the container into the filter.

2. The combination with a filter, of a supply pipe, a container independent of the supply pipe to receive loose filter material, connections through which a portion of the liquid to be filtered may be admitted to the container and through which the mixture of liquid and loose filter material may be discharged into the filter, and connections from the top of the container to a supply of gas under pressure by which the mixture of liquid and loose filter material may be forced from the container into the filter.

This specification signed and witnessed this 18th day of January A. D., 1911.

EDWARD ZAHM.

Signed in the presence of—
 THEO. L. POPP,
 ANNA HEIGIS.

---

Copies of this patent may be obtained for five cents each, by addressing the "Commissioner of Patents Washington, D. C."